United States Patent
Shimizu et al.

(10) Patent No.: US 9,995,591 B2
(45) Date of Patent: Jun. 12, 2018

(54) ESTIMATING A DEPARTURE TIME FOR A PLUG-IN ELECTRIC VEHICLE

(71) Applicant: TOYOTA JIDOSHA KABUSHIKI KAISHA, Toyota-shi, Aichi-ken (JP)

(72) Inventors: Takayuki Shimizu, Mountain View, CA (US); Kenichi Murakami, Cupertino, CA (US); Kunihiko Kumita, Toyota (JP); Tomoya Ohno, Toyota (JP)

(*) Notice: Subject to any disclaimer, the term of this patent is extended or adjusted under 35 U.S.C. 154(b) by 199 days.

(21) Appl. No.: 15/065,277

(22) Filed: Mar. 9, 2016

(65) Prior Publication Data

US 2017/0261331 A1 Sep. 14, 2017

(51) Int. Cl.
*G01C 21/34* (2006.01)
*B60L 11/18* (2006.01)

(52) U.S. Cl.
CPC ...... *G01C 21/3469* (2013.01); *B60L 11/1818* (2013.01); *B60L 11/1844* (2013.01)

(58) Field of Classification Search
CPC .................................................. H02J 7/0036
USPC .......................................................... 320/106
See application file for complete search history.

(56) References Cited

U.S. PATENT DOCUMENTS

| 9,744,873 | B2* | 8/2017 | Riley | B60L 11/1861 |
| 2013/0096751 | A1* | 4/2013 | Riley | B60L 3/12 |
| | | | | 701/22 |
| 2014/0006137 | A1* | 1/2014 | Melen | G06Q 10/1093 |
| | | | | 705/14.35 |
| 2014/0125279 | A1 | 5/2014 | Juhasz | |
| 2015/0283912 | A1* | 10/2015 | Shimizu | B60L 11/1862 |
| | | | | 320/157 |
| 2016/0047862 | A1* | 2/2016 | Shimizu | H02J 3/00 |
| | | | | 702/63 |
| 2017/0176195 | A1* | 6/2017 | Rajagopalan | G01C 21/3415 |

OTHER PUBLICATIONS

Robert Noland, et. al., "Travel-Time Uncertainty, Departure Time Choice, and the Cost of the Morning Commute," Department of Economics and Institute of Transportation Studies University of California, Irvine (Jan. 1995), pp. 1-32, downloaded Mar. 9, 2016 from bit.ly/1KkLqMS.
Ali Ashtari, et. al., "PEV Charging Profile Prediction and Analysis Based on Vehicle Usage Data," IEEE Transactions on Smart Grid, vol. 3, No. 1, Mar. 2012, pp. 341-350.

* cited by examiner

*Primary Examiner* — Suchin Parihar
(74) *Attorney, Agent, or Firm* — Burbage Law, P.C.; Jon-Michael Burbage; Elizabeth Ruzich

(57) ABSTRACT

The disclosure includes a system and method for determining a departure time for a Plug-in Electric Vehicle ("PEV"). The method may include analyzing power meter data to determine that a connector of a control device is coupled to an inlet of the PEV. The method may include charging a battery set of the PEV with electricity. The method may include determining a next day of a next journey for the PEV based on clock data provided by a clock. The clock data may describe time information describing a present day and a category of the next day. The method may include analyzing history data associated with the category of the next day to determine a habitual time associated with the category of the next day. The method may include estimating that a departure time for the next journey is substantially equal to the habitual time.

21 Claims, 9 Drawing Sheets

ESTIMATING A DEPARTURE TIME FOR A PLUG-IN ELECTRIC VEHICLE

BACKGROUND

The specification relates to estimating a departure time for a plug-in electric vehicle (herein "PEV" or "PEVs"). In particular, the specification relates to estimating a departure time for a PEV based on a historical pattern describing when a charging connector is removed from a charging inlet of the PEV.

PEVs are increasing in popularity. PEVs are typically charged at night on a daily basis. Energy prices vary over time. This price variance is described by Time-of-Use rate structures (herein "TOU" rate structures). Owners of PEVs have three goals when charging their PEV: (1) to minimize the cost of charging their PEV; (2) to ensure that their PEV has sufficient charge for the journeys they will take that day; and (3) to ensure that their PEV is charged prior to their departure time.

SUMMARY

Described are implementations for estimating a departure time for a PEV based on history data describing when a charging connector is removed from a charging inlet of the PEV. In some implementations, the estimate for the departure time may then be used to optimize a charging scheduling so that the PEV has adequate charge for the next day's journey.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: analyzing, by a control device, power meter data to determine that a connector of the control device is coupled to an inlet of a PEV, where the connector being coupled to the inlet causes a charger of the PEV to be operable to charge a battery set included in the PEV with electricity and the power meter data describes one or more readings of a power meter that indicate whether the connector is coupled to the inlet; charging the battery set with electricity via a power coupling formed by the connector being coupled to the inlet, where the charging occurs responsive to a determination that the connector is coupled to the inlet based on the analyzing of the power meter data; retrieving clock data from a non-transitory memory, where the clock data describes time information associated with a present day when the connector of the control device is coupled to the inlet of the PEV; determining a next day of a next journey for the PEV based on the clock data and a category of the next day; retrieving history data associated with the category of the next day, where the history data describes a habitual time when the connector and the inlet are decoupled for a plurality of historical days within the category of the next day; and estimating that a departure time for the next journey is substantially equal to the habitual time when the connector and the inlet are decoupled for the historical days within the category of the next day. Other embodiments of this aspect include corresponding computer systems, apparatus, and computer programs recorded on one or more computer storage devices, each configured to perform the actions of the methods.

Implementations may include one or more of the following features. The method where the history data describes a historical pattern of times when the connector and the inlet were decoupled for historical days within the category of the next day and the habitual time is indicated by the historical pattern. The method where the category of the next day is selected from a set of categories that includes: Monday; Tuesday; Wednesday; Thursday; Friday; Saturday; and Sunday. The method where the category of the next day is selected from a set of categories that includes: a weekday; and a weekend day. The method where the category of the next day is selected from a set of categories that includes a list of holidays for a geographic region where the PEV is located so that if the next day is a specific holiday then the category selected from the set includes a plurality of historical days that occurred on the specific holiday. The method where the clock data describes whether the next day is a holiday and an identifier for the specific holiday. The method where the clock data describes a present day of a week. The method where the power meter data describes one or more of the following: an increased current that indicates that the connector is coupled to the inlet; and an increased load that indicates that the connector is coupled to the inlet. The method where coupling the connector to the inlet triggers a signature response that is detectable in electricity transmitted via the power coupling shared between the control device and the inlet, where the power coupling is monitored by the control device using the power meter that records the power meter data describing the electricity transmitted via the power coupling, and the signature response includes a unique electrical characteristic that is described by the power meter data and the control device determines that the connector of the control device is coupled to the inlet of the PEV based on identifying a presence of the signature response in the power meter data. The method where the signature response includes a unique electrical characteristic of a charging circuit included in the PEV. The method further including: retrieving a charge schedule from the non-transitory memory, where the charge schedule describes a plurality of slots of time that are available for charging the battery set; and selecting a time slot from the plurality of time slots based on the estimated departure time so that the selected time slot occurs prior to the estimated departure time. The method further including: determining that the connector is decoupled from the inlet based on the power meter data describing an electronical condition that is consistent with a decoupling; receiving new clock data that describes a time when the connector was decoupled from the inlet and a category for the present day when the connector was decoupled from the inlet; building new history data that describes the time and the category; and storing the new history data in the non-transitory memory so that it is associated with other historical days that have the same category. The method further including: retrieving a charge schedule and time-of-use data ("TOU") from the non-transitory memory, where the charge schedule describes a plurality of slots of time that are available for charging the battery set and the TOU data describes a plurality of future time periods and one or more prices for electricity during each of the plurality of future time periods; and selecting a time slot from the plurality of time slots based on the estimated departure time and the TOU data so that the selected time slot occurs prior to the estimated departure time and is optimized to charge the battery set at a substantially minimum price. The method further including: identifying a route for the next journey; determining an amount of charge needed in the battery set for the PEV to complete the route; retrieving a charge schedule and TOU data from the non-transitory memory, where the charge schedule describes a plurality of slots of time that are available for charging the battery set and the TOU data describes a plurality of future time periods and one or more prices for electricity during each of the plurality of future time periods; and selecting one or more time slots from the plurality of time slots based on the estimated departure time, the TOU data and the amount of charge needed in the battery set, where the one or more time slots are selected so that, at the departure time and for a substantially minimized price, the battery set will store at a minimum the amount of charge needed in the battery set for the PEV to complete the route. Implementations of the described techniques may include hardware, a method or process, or computer software on a computer-accessible medium.

One general aspect includes a computer program product including a non-transitory computer-usable medium including a computer-readable program, where the computer-readable program when executed on a computer causes the computer to: analyze, by a processor of the computer, power meter data to determine that a connector of a control device is coupled to an inlet of a PEV, where the connector being coupled to the inlet causes a charger of the PEV to be operable to charge a battery set included in the PEV with electricity and the power meter data describes one or more readings of a power meter that indicate whether the connector is coupled to the inlet; charge the battery set with electricity via a power coupling formed by the connector being coupled to the inlet, where the charging occurs responsive to a determination that the connector is coupled to the inlet based on the analysis of the power meter data; retrieve clock data from a non-transitory memory, where the clock data describes time information associated with a present day when the connector of the control device is coupled to the inlet of the PEV; determine a next day of a next journey for the PEV based on the clock data and a category of the next day; retrieve history data associated with the category of the next day, where the history data describes a habitual time when the connector and the inlet are decoupled for a plurality of historical days within the category of the next day; and estimate that a departure time for the next journey is substantially equal to the habitual time when the connector and the inlet are decoupled for the historical days within the category of the next day. Other embodiments of this aspect include corresponding computer systems, apparatus, and computer programs recorded on one or more computer storage devices, each configured to perform the actions of the methods.

Implementations may include one or more of the following features. The computer program product where the history data describes a historical pattern of times when the connector and the inlet were decoupled for historical days within the category of the next day and the habitual time is indicated by the historical pattern. The computer program product where the computer-readable program when executed on the computer further causes the computer to: retrieve a charge schedule from the memory, where the charge schedule describes a plurality of slots of time that are available for charging the battery set; and select a time slot from the plurality of time slots based on the estimated departure time so that the selected time slot occurs prior to the estimated departure time. The computer program product where the computer-readable program when executed on the computer further causes the computer to: retrieve a charge schedule and TOU data from the memory, where the charge schedule describes a plurality of future time periods and one or more prices for electricity during each of the plurality of future time periods; and select a time slot from the plurality of time slots based on the estimated departure time and the TOU data so that the selected time slot occurs prior to the estimated departure time and is optimized to charge the battery set at a substantially minimum price. The computer program product where the computer-readable program when executed on the computer further causes the computer to: identify a route for the next journey; determine an amount of charge needed in the battery set for the PEV to complete the route; retrieve a charge schedule and TOU data from the memory, where the charge schedule describes a plurality of slots of time that are available for charging the battery set and the TOU data describes a plurality of future time periods and one or more prices for electricity during each of the plurality of future time periods; and selecting one or more time slots from the plurality of time slots based on the estimated departure time, the TOU data and the amount of charge needed in the battery set, where the one or more time slots are selected so that, at the departure time and for a substantially minimized price, the battery set will store at a minimum the amount of charge needed in the battery set for the PEV to complete the route. Implementations of the described techniques may include hardware, a method or process, or computer software on a computer-accessible medium.

One general aspect includes a system including: a PEV coupled to a control device; where the PEV includes a battery set operable to be charged by the control device, where the control device includes a monitor module that includes computer-readable code that, when executed by a processor, causes the processor to perform steps including: analyzing power meter data to determine that a connector of the control device is coupled to an inlet of the PEV, where the connector being coupled to the inlet creates a power coupling that causes a charger of the PEV to be operable to charge a battery set included in the PEV with electricity provided by the control device via the power coupling, where the power meter data describes one or more readings of a power meter that indicate whether the connector is coupled to the inlet; charging the battery set with electricity; determining a next day of a next journey for the PEV based on clock data provided by a clock, where the clock data describes time information associated with a present day and a category of a next day occurring after the present day; analyzing history data associated with the category of the next day to determine a habitual time associated with the category of the next day, where the history data describes a historical pattern of times when the connector and the inlet were decoupled for a plurality of historical days within the category of the next day and the habitual time is indicated by the historical pattern; and estimating that a departure time for the next journey is substantially equal to the habitual time. Other embodiments of this aspect include corresponding computer systems, apparatus, and computer programs recorded on one or more computer storage devices, each configured to perform the actions of the methods.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

PEVs are generally charged each night. Owners of a PEV may have three goals when charging their PEV: (1) minimize the cost of charging their PEV; (2) ensure that their PEV has sufficient charge for the journeys they will take that day; and (3) ensure that their PEV is charged prior to their departure time.

Experience has shown that it is difficult to ensure that PEVs are charged prior to departure time because current methods of estimating a driver's departure time are inaccurate. The control system described herein solves this problem by providing an accurate way of estimating a departure time based on history data describing when a charging connector is removed from the charging inlet of the PEV. For example, the control device assumes that a driver decouples the connector from the inlet just prior to beginning a journey, and that the time associated with this decoupling event corresponds to the departure time. This information may be stored over time and analyzed by the control device 199 to determine the driver's habit for departing on different categories of days.

In some implementations, the control device may estimate that the departure time for a given day will be consistent with their habit. For example, if the diver habitually departs for their daily commute to work at 6:00 AM each Wednesday, then the control device 199 may estimate that on Tuesday night when the driver couples the connector to the inlet that the driver will depart on 6:00 AM next Wednesday, and so, the PEV should be charged prior to 6:00 AM the next morning in order to be ready for the next journey.

The control device may be configured to account for variations in the driver's habit based on their different habits on weekends, holidays, birthdays, etc. For example, the driver's habits likely indicate that they depart later on the weekend or a holiday then they do on a weekday since they habitually work on weekdays but not on the weekend or holidays.

System Overview

Figure 1:
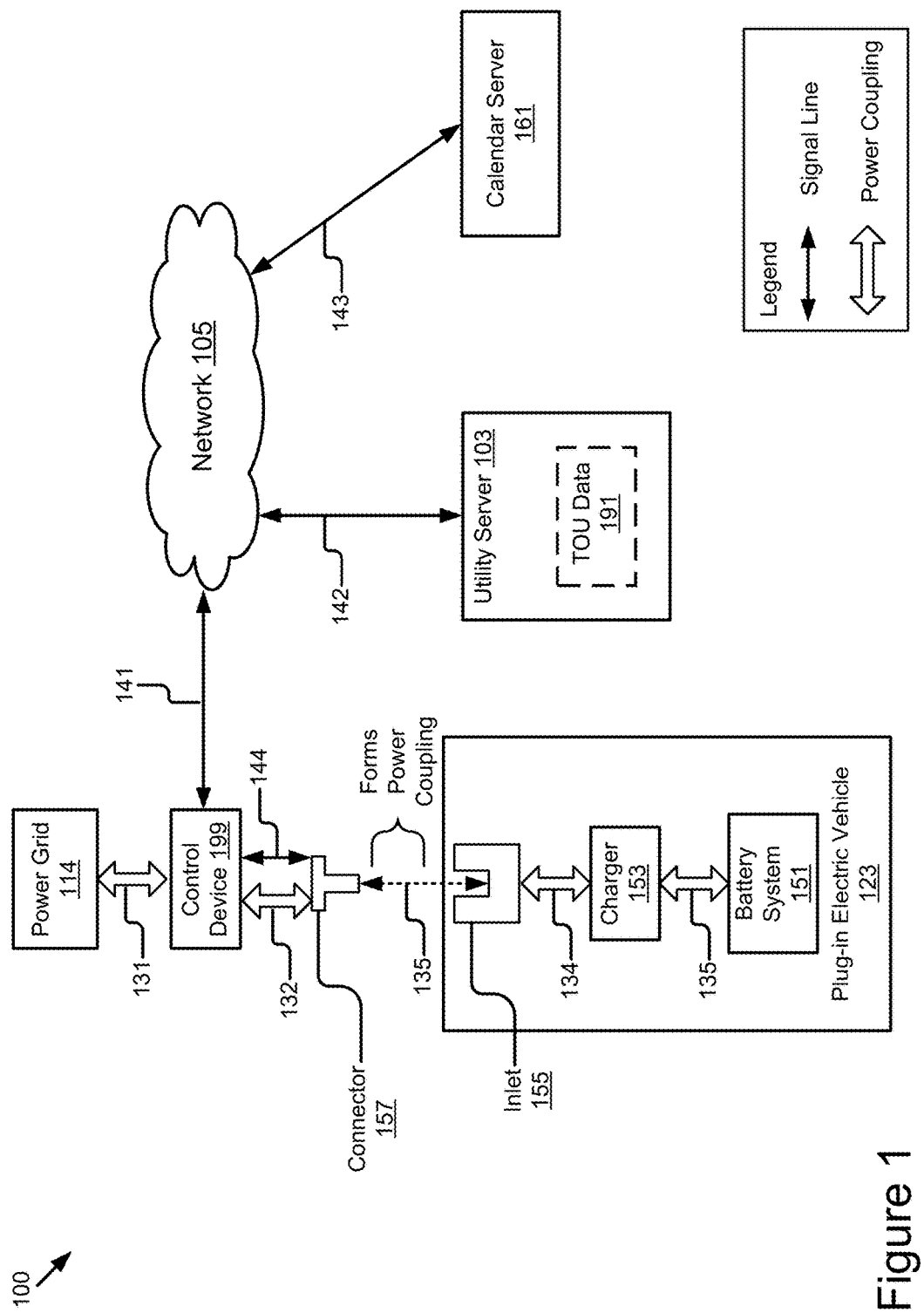
FIG. 1 is a block diagram illustrating an example system for estimating a departure time for a Plug-in Electric Vehicle.

FIG. 1 is a block diagram illustrating an example system 100 for estimating a departure time for a Plug-in Electric Vehicle 123 (herein "PEV 123").

The illustrated system 100 includes: a utility server 103; a calendar server 161; a PEV 123 having an inlet 155; a control device 199 having a connector 157; and a power grid 114. In the illustrated implementation, these entities of the system 100 are communicatively coupled via a network 105. The system 100 may include other servers or devices not shown in FIG. 1 including, for example, a traffic server for providing traffic data, a power service server for providing power usage service (e.g., billing service), a map server for providing map data and a content server for providing content (e.g., music, videos, podcasts, etc.), etc.

The utility server 103 is communicatively coupled to the network 105 via a signal line 142. The calendar server 161 is communicatively coupled to the network 105 via a signal line 143. The control device 199 is communicatively coupled to the network 105 via a signal line 141.

Some of the entities of FIG. 1 are coupled to one another via a power coupling. A power coupling may include one or more electrical conduits that transmits electricity from one device to another. Power couplings may include electrical components such as transformers, inverters, switches, breakers, fuses, etc.

The power grid 114 is coupled to the control device 199 via a power coupling 131. The control device 199 is coupled to the connector 157 via a power coupling 132. The connector 157 is configured to couple with the inlet 155 to form a power coupling 135. The power coupling 135 is depicted with a dashed line in FIG. 1 to indicate that the connector 157 may also be decoupled from the inlet 155 to break the power coupling 135.

Optionally, a signal line 144 may indicate that a power meter (or some other sensor or set of sensors) included in the control device 199 may monitor whether the connector 157 is coupled to the inlet 155 to form the power coupling 135.

The PEV 123, utility server 103 and calendar server 161 in FIG. 1 can be used by way of example. While FIG. 1 illustrates one PEV 123, one utility server 103 and one calendar server 161, the present disclosure applies to a system architecture having one or more PEVs 123, one or more utility servers 103 and one or more calendar servers 161. The one or more PEVs 123 may have one or more users. Furthermore, although FIG. 1 illustrates one network 105 coupled to the entities of the system 100, in practice, one or more networks 105 can be connected to these entities. Furthermore, while FIG. 1 includes one utility server 103, one calendar server 161, one power grid 114, one control device 199, one connector 157, one inlet 155 and one PEV 123, the system 100 could include one or more of these entities. In addition, the separation of various components and servers in the implementations described herein should not be understood as requiring such separation in all implementations, and it should be understood that the described components, devices or servers can generally be integrated together in a single component, device or server.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, WAP, e-mail, millimeter wave communication, etc.

The PEV 123 may include an electric vehicle or a plug-in hybrid vehicle that may be recharged from an external source of electricity. In some implementations, access to the electrical source is controlled by the control device 199.

The PEV 123 may include an inlet 155, a battery system 151 and a charger 153.

The inlet 155 may include a charging inlet for a PEV 123. The inlet 155 may be constructed in accordance with industry standards for a charging inlet included in a PEV 123. The inlet 155 may be configured to couple with the connector 157 to form the power coupling 135. The inlet 155 may be configured to decouple with the connector 157 to break the power coupling 135.

The charger 153 may include an internal charging system for a PEV 123. The charger 153 may include a charging circuit.

In some implementations, the inlet 155 may be coupled to the connector 157 via the power coupling 135. The inlet 155 may be coupled to the charger 153 via a power coupling 134. The charger 153 may be coupled to the battery system 151 via the power coupling 135. The inlet 155 may receive electricity from the connector 157 via the power coupling 135. The inlet 155 may transmit electricity to the charger 153 via the power coupling 134. The charger 153 may charge the battery system 151 with the electricity received from the inlet 155.

The charger 153 may invert the electricity from alternating current ("AC") to direct current ("DC"), step up the voltage of the electricity, step down the voltage of the electricity or take other steps as needed based on the requirements of the battery system 151.

The battery system 151 may include a set of rechargeable batteries. Electricity may be stored in the batteries. The electricity may be used to drive or contribute to the drive of the wheels of the PEV 123. The battery system 151 of the PEV 123 is described in more detail below with reference to FIG. 2.

In some implementations, the PEV 123 may include an electric engine that drives the wheels of the PEV 123 or an electric engine and a combustion engine that work together to drive the wheels of the PEV 123 or drive the wheels separately at different times as configured by the user of the PEV 123.

The control device 199 may include a charging system configured to receive electricity from the power grid 114 via the power coupling 131 and transmit the electricity to the connector 157 via the power coupling 132. The control device 199 may control access to the electricity provided by the power grid 114. The power grid 114 may include a conventional power grid 114 for supplying electricity. The electricity may be a standard voltage such as one or more of the following: 120 volts; 220 volts; and 480 volts.

The control device 199 may include hardware such as transformers and inverters necessary to step down the voltage, step up the voltage or invert the electricity from AC to DC as needed for the charger 153 and the battery system 151 of the PEV 123.

In some implementations, the PEV 123 may include a set of one or more sensors. The sensor set may include any type of conventional sensors configured to collect any type of data. For example, the sensors included in the sensor set may be one of a navigation sensor (e.g., a global positioning system (GPS) sensor), an infrared detector, a motion detector, a thermostat, a sound detector, and any other type of sensors.

In some implementations, the sensor set may include a combination of different types of sensors. For example, the sensor set may include different sensors for measuring one or more of a current time, a location of the PEV 123 (e.g., a latitude, longitude, and altitude of a location), an acceleration of the PEV 123, a velocity of the PEV 123, a charge level of the battery system of the PEV 123, etc. The sensor set may generate sensor data describing the one or more measurements and send the sensor data to an element of the system 100 such as the control device 199.

In some implementations, the control device 199 may include a charge station that supplies electric power for recharging the battery system 151 included in the PEV 123. For example, the control device 199 may include a charge station to provide electric power for recharging battery systems in all-electric vehicles or plug-in hybrid electric vehicles such as the PEV 123. In some implementations, the control device 199 may be a household charge station at a residence. In some other implementations, the control device 199 may be a public charge station on a street or a parking lot.

In some implementations, the control device 199 may include a computer system that is configured to send and receive communications with the network 105.

In some implementations, the control device 199 include hardware, software or a combination of hardware and software. The control device 199 may include software that may be operable to cause a processor of the control device 199 to execute one or more of the steps described below with reference to method 400 described below with reference to FIGS. 4A-4E.

In some implementations, one or more elements of the control device 199 may be implemented using hardware including a field-programmable gate array ("FPGA") or an application-specific integrated circuit ("ASIC"). In some other implementations, the control device 199 may be implemented using a combination of hardware and software. The control device 199 is described in more detail below with reference to FIGS. 2-5.

Figure 2:
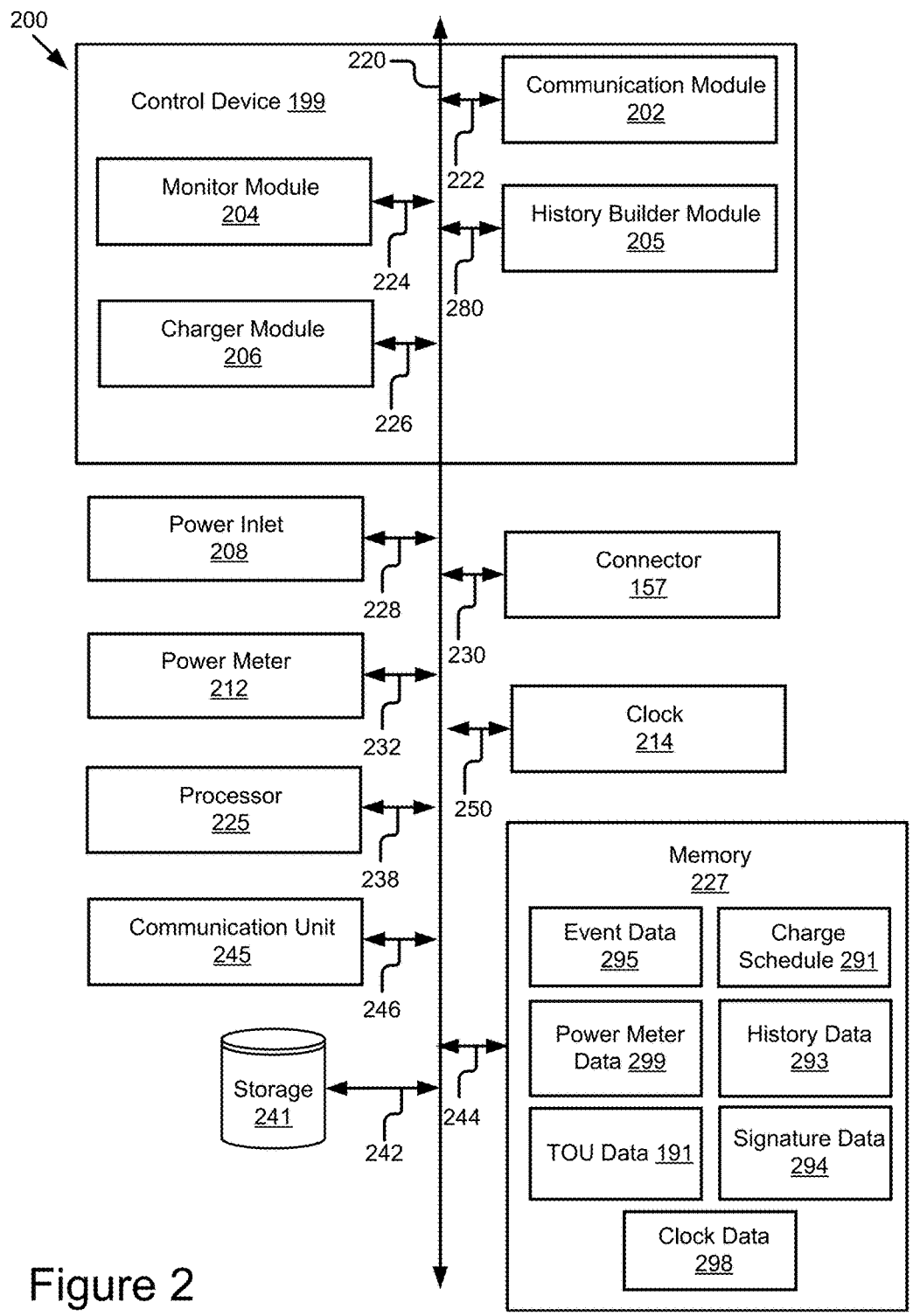
FIG. 2 is a block diagram illustrating an example of a control device to estimate a departure time for a Plug-in Electric Vehicle.

The utility server 103 may include a hardware server that includes a processor, a memory, and network communication capabilities. The utility server 103 may be operated by a utility. The utility may include an organization that manages, maintains and operates the power grid 114. The utility may sell the energy to consumers at rates described by the Time-of-Use data 191 ("TOU data 191"). The TOU data may describe rates for purchasing electricity from the power grid 114 at different times of the day or night. The operators of the utility server 103 may create and publish the TOU data 191 via the network 105. Accordingly, although the TOU data 191 is depicted in FIG. 1 as stored in a non-transitory memory of the utility server 103, in practice the TOU data 191 may be stored in a non-transitory memory of the control device 199 as depicted in FIG. 2.

The utility server 103 may include sensors and software that monitor the supply of electricity on the power grid 114 and consumer demand for the electricity on the power grid 114. In some implementations, the utility server 103 may take actions to attempt to achieve and maintain a state of balance (or a state of being substantially balanced) in the supply and demand of power on the power grid 114.

The utility server 103 may issue a Demand Response event ("DR event") in order to attempt to achieve and maintain a state of balance (or a state of being substantially balanced) in the supply and demand of power on the power grid 114. The DR event may be published via the network 105 to devices connected to the power grid 114. The DR event may result in higher prices in electricity or a requirement that electrical devices connected to the power grid 114 reduce or eliminate their consumption of electricity from the power grid 114 for a specified period of time.

As mentioned briefly above, the TOU data 191 may include data describing rates for electricity purchased from the power grid 114. This data may include a Time-of-Use rate structure (herein "TOU rate structure") for electricity purchased from the power grid 114. The TOU rate structure may describe the different prices charged by the utility server 103 for power under different conditions, i.e., time-of-use pricing (herein "TOU pricing"). The TOU rate structure may also describe historical patterns of power usage by consumers of the power sold by the utility server 103.

For example, the price per watt of power sold by the utility may vary based on one or more factors such as: time of day; demand by consumers; supply of power on the power grid 114; the presence of a demand response event (herein "DR event" or "DR events") for a particular time period; weather conditions affecting energy consumption or energy production; a day of the week that affects energy consumption or energy production; a presence of a holiday or other event on the day of the week that affects energy consumption or energy production; a historical pattern of energy usage by its consumers under various conditions as a predictor of future energy usage under similar conditions; an estimation of future demand by consumers; and other conventional factors that are included in a TOU pricing structure.

In some implementations, the TOU rate structure described by the TOU data 191 may include electricity prices that are set for a specific time period on an advance or forward basis. The electricity prices may not change over time and be updated throughout the day or throughout the year. Prices paid for energy consumed during these periods may be pre-established and known to the control device 199 in advance, allowing the control device 199 to vary its usage of electricity in response to such prices and manage energy costs by shifting usage to a lower cost period or reducing its consumption overall.

In some implementations, the TOU rate structure described by the TOU data 191 may include a critical peak pricing structure. Under a critical peak pricing structure, TOU prices are in effect except for certain peak days, when the price per watt may reflect the costs of generating our purchasing electricity at the wholesale level. The pricing may be affected by one or more DR events.

In some implementations, the TOU rate structure described by the TOU data 191 may include real-time pricing structure, i.e., dynamic pricing. Under real time pricing structure, electricity prices may change every hour, every 30 minutes, every 15 minutes, every 5 minutes or on a minute-by-minute basis. A price signal may be provided to the control device 199 via the network 105 on an advanced or forward basis, reflecting the cost of the utility to generate or purchase electricity at the wholesale level. The price signal may include one or more DR events.

The real-time pricing structure that may be described by the TOU data 191 may be responsive to Demand Response (herein "DR"). DR may be described as the changes in electricity usage by end-use customers from their normal consumption patterns in response to changes in the price of electricity over time. DR may also relate to incentive payments designed to induce lower electricity use at times of high wholesale market prices or when the electricity grid is unreliable. DR includes all intentional modifications to consumption patterns of electricity of end-use customers that are intended to alter the timing, level of instantaneous demand, or the total electricity consumption. As such, the TOU rate structure described by the TOU data 191 may vary over time based on one or more DR events.

The charge schedule 291 may be determined by the operators of the utility server 103. The utility server 103 may publish the charge schedule 291. For example, the charge schedule 291 may be published via the network 105.

A DR event may be an event relating to DR in an electricity grid system. For example, a DR event may be an event indicating that the price for electricity is scheduled to increase at a certain time and that the control device 199 may reduce its consumption of electricity to a specific usage. In some implementations, a DR event includes one or more DR requirements. For example, a DR event indicates the power usage between 6:00 PM and 11:00 PM at a user's home cannot exceed a predetermined amount of electricity. Other example requirements are possible.

The calendar server 161 can be a hardware server that includes a processor, a memory, and network communication capabilities. In the illustrated implementation, the calendar server 161 is coupled to the network 105. The calendar server 161 sends and receives data to and from other entities of the system 100 via the network 105. For example, the calendar server 161 sends data describing a user's calendar to the control device 199 upon request and with permission from the user.

The system 100 may include a weather server. The weather server can be a hardware server that includes a processor, a memory, and network communication capabilities. The weather server may be coupled to the network 105. The weather server may send and receive data to and from other entities of the system 100 via the network 105. For example, the weather server sends weather data to the control device 199 or the utility server 103 upon request. The weather data may describe a weather forecast for the geographic area where the control device 199 is located.

Departure Time Estimation System

Referring now to FIG. 2, an example of the control device 199 is shown in more detail. FIG. 2 is a block diagram of a computing device 200 that includes the control device 199, a power inlet 208, the connector 157, a power meter 212, a clock 214, a processor 225, a communication unit 245, a storage 241 and a memory 227 according to some examples. The components of the computing device 200 are communicatively coupled by a bus 220.

In the illustrated implementation, power inlet 208 is communicatively coupled to the bus 220 via a signal line 228. The connector 157 is communicatively coupled to the bus 220 via a signal line 230. The power meter 212 is communicatively coupled to the bus 220 via a signal line 232. The clock 214 is communicatively coupled to the bus 220 via a signal line 250. The processor 225 is communicatively coupled to the bus 220 via a signal line 238. The memory 227 is communicatively coupled to the bus 220 via a signal line 244. The communication unit 245 is communicatively coupled to the bus 220 via a signal line 246. The storage 241 is communicatively coupled to the bus 220 via a signal line 242.

The connector 157 was described above with reference to FIG. 1, and so, that description will not be repeated here.

The power inlet 208 includes hardware for coupling the control device 199 to the power grid 114 to receive electricity from the power grid 114.

The power meter 212 includes hardware for measuring one or more electrical characteristics or waveforms included in the power coupling 135 between the connector 157 and the inlet 155 and the power coupling 132 between the control device 199 and the connector 157. The power meter 212 may create and store power meter data 299 in the memory 227 or transmit the power meter data 299 to the communication module 202. The power meter data 299 may describe the measurements of the power meter 212.

The clock 214 may include an electronic device operable to measure time. The clock 214 may include hardware, software or a combination of hardware and software. The clock 214 may measure time using one or more of the following units of measurement: day of the week; whether the day is a weekday or weekend day; whether the day is a holiday; the hour of the day; the minutes in the hour; and the seconds in the minute. The measurements of the clock 214 may be described by the clock data 298. The clock 214 may store the clock data 298 in the memory 227 or transmit the clock data 298 to the communication module 202. The clock data 298 is described in more detail below according to some implementations with reference to the method 400.

The processor 225 includes an arithmetic logic unit, a microprocessor, a general purpose controller, or some other processor array to perform computations and provide electronic display signals to a display device. The processor 225 is coupled to the bus 220 for communication with the other components via signal line 238. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors may be included. Other processors, operating systems, sensors, displays, and physical configurations may be possible.

The memory 227 stores instructions or data that may be executed by the processor 225. The memory 227 is coupled to the bus 220 for communication with the other components via signal line 244. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores event data 295, a charge schedule 291, history data 293, power meter data 299, signature data 294, TOU data 191 and clock data 298.

The event data 295 may be data describing one or more DR events. The DR events may be published by the operator of the utility server 103.

The charge schedule 291 may include data describing one or more time slots when the PEV 123 may be charged by the control device 199. One or more of the time slots may not be available based on the presence of one or more DR events.

Figure 5:
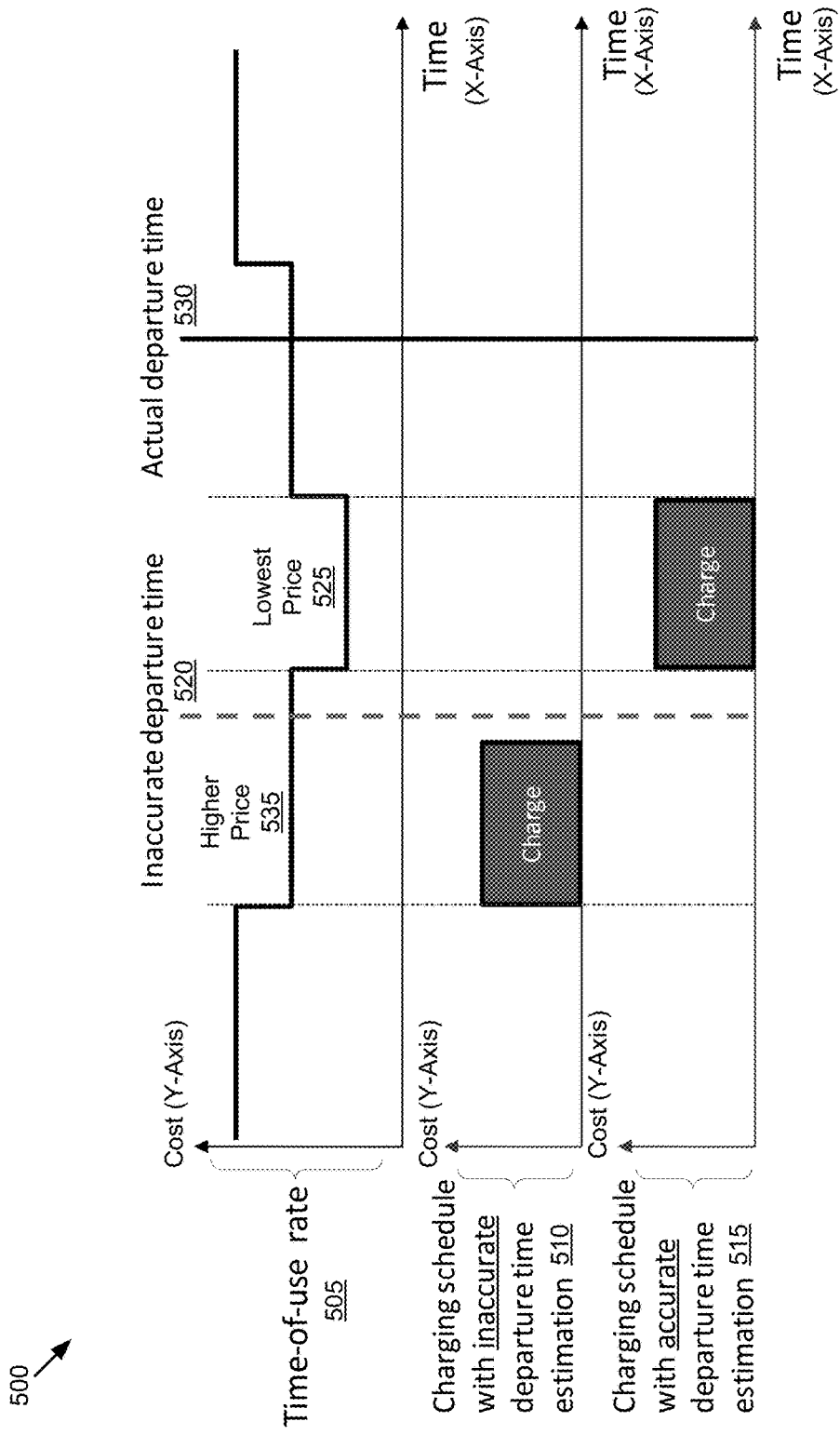
FIG. 5 is a graphic depicting an example benefit of determining the departure time of a Plug-in Electric Vehicle based on when a connector of a control device is decoupled from an inlet of the Plug-in Electric Vehicle.

The charge schedule 291 may be associated with the TOU data 191. For example, the time slots may be associated with the TOU rates included in the TOU data 191 so that the cost for charging the PEV 123 in the different time slots varies based on the TOU rates. An example of the TOU rate varying over time for different time slots is depicted in FIG. 5.

The history data 293 may describe one or more times when the user of the PEV 123 habitually disconnects the connector 157 from the inlet 155 on different categories of days.

Figure 3:
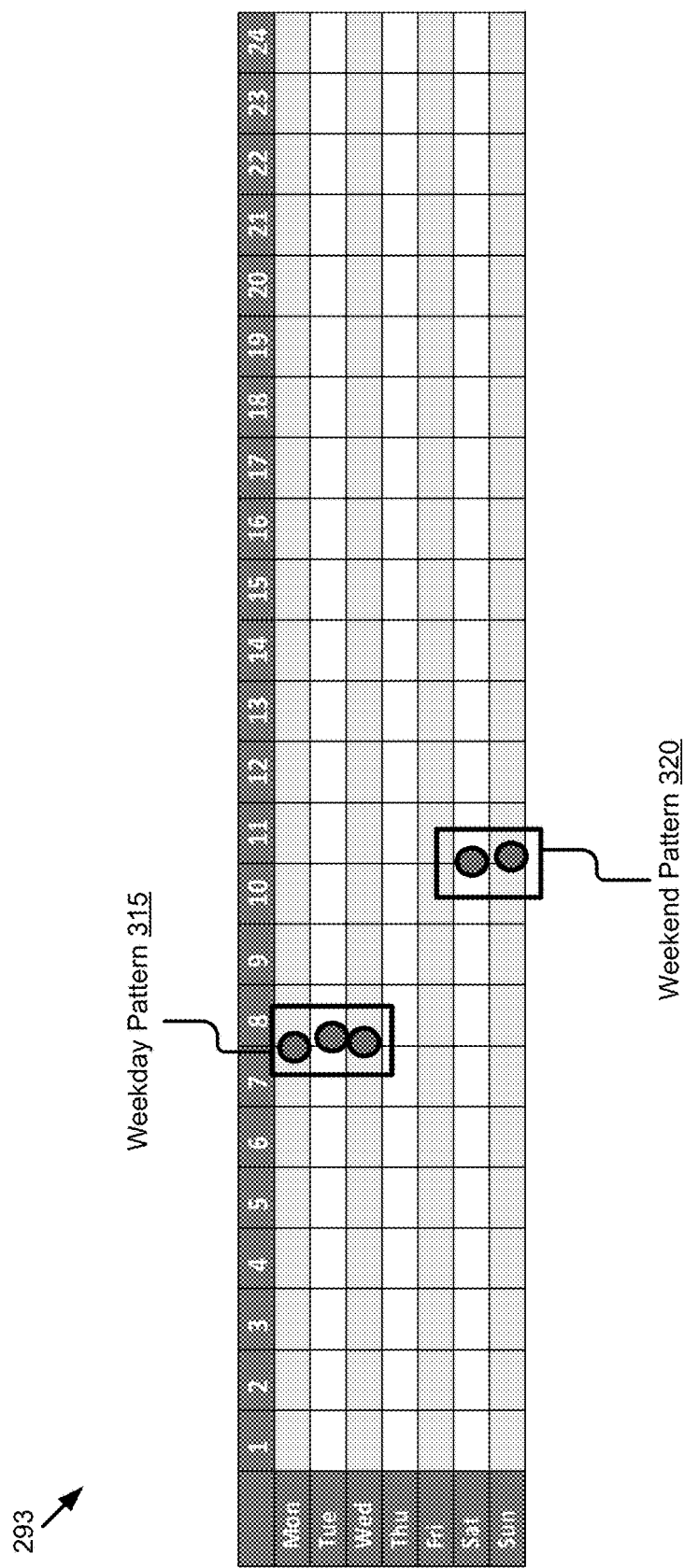
FIG. 3 is a table including history data describing a historical pattern of times when a Plug-in Electrical Vehicle departs on a weekday and a historical pattern of times when a Plug-in Electrical Vehicle departs on a weekend day.

In some implementations, the history data 293 describes a habitual time when the connector 157 and the inlet 155 are decoupled for a plurality of historical days associated with a category that describes the plurality of historical days. For example, the category may be "Monday" and the history data 293 may describe different times when the connector 157 was decoupled from the inlet 155 over the plurality of days. Analysis of these days may indicate a pattern of behavior by the user of the PEV 123. Other categories are possible, including the following: weekday (which includes Monday, Tuesday, Wednesday, Thursday and Friday); a weekend day (which includes Saturday and Sunday); Monday; Tuesday; Thursday; Wednesday; Thursday; Friday; Saturday; Sunday; and an outlier category (e.g., the name of a holiday, a description of a birthday, a description of an anniversary, etc.). For example, if the present day is a Sunday and the day of the next journey is the following Monday, then the category is "Monday" or "weekday." If the day of the next journey had been Saturday, then the category may have been "Saturday" or "weekend day." An example of history data 293 according to some implementations is depicted in FIG. 3.

In some implementations, the PEV 123 includes a charger 153 that produces a signature response when the connector 157 is coupled to the inlet 155. For example, coupling the connector 157 to the inlet 155 may trigger a signature response that is a unique electrical characteristic of the charging circuit of the PEV 123. Decoupling the connector 157 from the inlet 155 may trigger another signature response that is a unique electrical characteristic of the charging circuit of the PEV 123. The signature responses associated with the coupling and the decoupling may be the same or different. The signature response may include a pattern or waveform present in the power meter data 299. The signature data 294 may describe the signature response associated with the coupling and the decoupling. The monitor module 204 of the control device 199 may analyze the signature data 294 to record (or "learn") the signature response and monitor the power meter data 299 for this signature response to be present in the power meter data 299. When the signature response is identified, the monitor module 204 may determine that the connector 157 is coupled to the inlet 155 (thereby forming a power coupling 135) or decoupled from the inlet 155 (thereby breaking the power coupling 134).

The TOU data 191, the power meter data 299 and the clock data 298 are described above with reference to FIGS. 1 and 2, and so, those descriptions will not be repeated here.

The communication unit 245 transmits and receives data to and from the network 105 or to another communication channel. The communication unit 245 is coupled to the bus 220 via signal line 246. In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the network 105 or other communication channels using one or more wireless communication methods, including IEEE 802.11, IEEE 802.16, BLUETOOTH®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The storage 241 can be a non-transitory storage medium that stores data for providing the functionality described herein. The storage 241 may be a dynamic random access memory (DRAM) device, a static random access memory (SRAM) device, flash memory, or some other memory devices. In some implementations, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage 241 is communicatively coupled to the bus 220 via signal line 242.

In the illustrated implementation shown in FIG. 2, the control device 199 includes a communication module 202, a history builder module 205 and a charger module 206. These components of the control device 199 are communicatively coupled to each other via the bus 220. In some implementations, components of the control device 199 can be stored in a single server or device. In some other implementations, components of the control device 199 can be distributed and stored across multiple servers or devices.

The communication module 202 can be software including routines for handling communications between the control device 199 and other components of the computing device 200. In some implementations, the communication module 202 can be a set of instructions executable by the processor 225 to provide the functionality described below for handling communications between the control device 199 and other components of the computing device 200. In some implementations, the communication module 202 can be stored in the memory 227 of the computing device 200 and can be accessible and executable by the processor 225. The communication module 202 may be adapted for cooperation and communication with the processor 225 and other components of the computing device 200 via signal line 222.

The communication module 202 sends and receives data, via the communication unit 245, to and from one or more of the utility server 103 and the calendar server 161. For example, the communication module 202 receives, via the communication unit 245, calendar data associated with a user from the calendar server 161 and sends the calendar data to the charger module 206. In another example, the communication module 202 receives graphical data for providing a user interface to a user sends the graphical data to a display of the PEV 123 (e.g., the head unit, the infotainment system, the heads-up display unit), causing the display to present the user interface to the user.

In some implementations, the communication module 202 receives data from components of the control device 199 and stores the data in one or more of the storage 241 and the memory 227. For example, the communication module 202 receives the TOU data 191 from the communication unit 245 and stores the TOU data 191 in the memory 227.

In some implementations, the communication module 202 may handle communications between components of the control device 199. For example, the communication module 202 receives a clock data 298 from the clock 214.

The monitor module 204 can be software including routines for monitoring the power meter data 299 to determine whether the connector 157 has been coupled to the inlet 155 or decoupled from the inlet 155. In some implementations, the monitor module 204 may include routines that, when executed by the processor 225, cause the processor 225 to execute one or more steps of the method 400. In some implementations, the monitor module 204 can be stored in the memory 227 of the computing device 200 and can be accessible and executable by the processor 225. The monitor module 204 may be adapted for cooperation and communication with the processor 225 and other components of the computing device 200 via signal line 224.

The history builder module 205 can be software including routines for building the history data 293. In some implementations, the history builder module 205 may include routines that, when executed by the processor 225, cause the processor 225 to execute one or more steps of the method 400. In some implementations, the history builder module 205 can be a set of instructions executable by the processor 225 to provide the functionality described below for building the history data 293. In some implementations, the history builder module 205 can be stored in the memory 227 of the computing device 200 and can be accessible and executable by the processor 225. The history builder module 205 may be adapted for cooperation and communication with the processor 225 and other components of the computing device 200 via signal line 280.

In some implementations, the history builder module 205 receives a signal from the monitor module 204 that the connector 157 is decoupled from the inlet 155. The history builder module 205 may retrieve clock data 298 describing the time of day and the day of the week. The history builder module 205 may determine a category for the clock data 298. The category may include one or more of the following: weekday (which includes Monday, Tuesday, Wednesday, Thursday and Friday); a weekend day (which includes Saturday and Sunday); Monday; Tuesday; Thursday; Wednesday; Thursday; Friday; Saturday; Sunday; and an outlier category (e.g., the name of a holiday, a description of a birthday, a description of an anniversary, etc.).

The history builder module 205 may generate history data 293 that describes one or more of the following: that the connector 157 was decoupled from the inlet 155; the day of the week that the decoupling occurred; the category of the day when the decoupling occurred; the time of the day when the decoupling occurred. The history builder module 205 may store the history data 293 in a data structure of the memory 227 so that it is associated with the category and may be retrieved by a query using the category along with all the other history data 293 that is associated with that category.

The history builder module 205 may analyze the history data 293 for different categories to determine the habitual patterns of the user for the different categories.

The history builder module 205 may update the history data 293 and the habitual patterns based on history data 293 that is newly stored in the memory 227.

The charger module 206 can be software including routines for determining a next journey for the PEV 123 and ensuring that the PEV 123 has a sufficient charge for its next journey. In some implementations, the charger module 206 may include routines that, when executed by the processor 225, cause the processor 225 to execute one or more steps of the method 400. In some implementations, the charger module 206 can be a set of instructions executable by the processor 225 to provide the functionality described below for selecting time slots for the charge schedule 291 or controlling access to electricity provided by the power grid 114. In some implementations, the charger module 206 can be stored in the memory 227 of the computing device 200 and can be accessible and executable by the processor 225. The charger module 206 may be adapted for cooperation and communication with the processor 225 and other components of the computing device 200 via signal line 226.

In some implementations, the charger module 206 can be a set of instructions executable by the processor 225 to provide the functionality described below for receiving clock data 298 and determining a day of a next journey for the PEV 123 based on the clock data 298.

In some implementations, the charger module 206 can be a set of instructions executable by the processor 225 to provide the functionality described below for determining a category for the day of the next journey. The category may include one or more of the following: weekday (which includes Monday, Tuesday, Wednesday, Thursday and Friday); a weekend day (which includes Saturday and Sunday); Monday; Tuesday; Thursday; Wednesday; Thursday; Friday; Saturday; Sunday; and an outlier category (e.g., the name of a holiday, a description of a birthday, a description of an anniversary, etc.).

In some implementations, the charger module 206 can be a set of instructions executable by the processor 225 to provide the functionality described below for retrieving history data 293 associated with the category of the next journey.

In some implementations, the charger module 206 can be a set of instructions executable by the processor 225 to provide the functionality described below for estimating the departure time for the next journey based on the history data 293. For example, the history data may describe a habitual time when the user of the PEV 123 disconnects the connector 157 from the inlet 155 and this time may be estimated to be the departure time.

In some implementations, the charger module 206 can be a set of instructions executable by the processor 225 to provide the functionality described below for retrieving one or more of the TOU data 191, the event data 295 and the charge schedule 291.

In some implementations, the charger module 206 can be a set of instructions executable by the processor 225 to provide the functionality described below for selecting time slots from the charge schedule 291 that occur before the estimated departure time and are optimized to charge the PEV 123 for the least amount or cost. The charge may be configured to give the PEV 123 sufficient charge for the next journey or a complete charge for the battery system 151.

FIG. 3 is a table including history data 293 describing a historical pattern of times when a PEV 123 departs on a weekday 315 and a historical pattern of times when the PEV 123 departs on a weekend day 320 as indicated by the times when the user decouples the connector 157 from the inlet 155 on a plurality of historical days.

In some implementations, the PEV 123 may receive graphical data describing the table. For example, the memory 227 may store the graphical data and the communication unit 245 may transmit the graphical data to the PEV 123 or a client device of the user (e.g., a smartphone of the user). The PEV 123 or the client device may generate a graphical user interface ("GUI") that depicts the table. For example, the GUI may be displayed on a touch sensitive display of the head unit included in the PEV 123 or the display of the client device. The PEV 123 may also include a heads-up display unit that may display the GUI including the table or an infotainment system that includes a display for displaying the GUI for viewing by the user of the PEV 123.

Methods

FIGS. 4A to 4E are a flowchart of an example method 400 for estimating a departure time for a PEV 123.

Figure 4A:
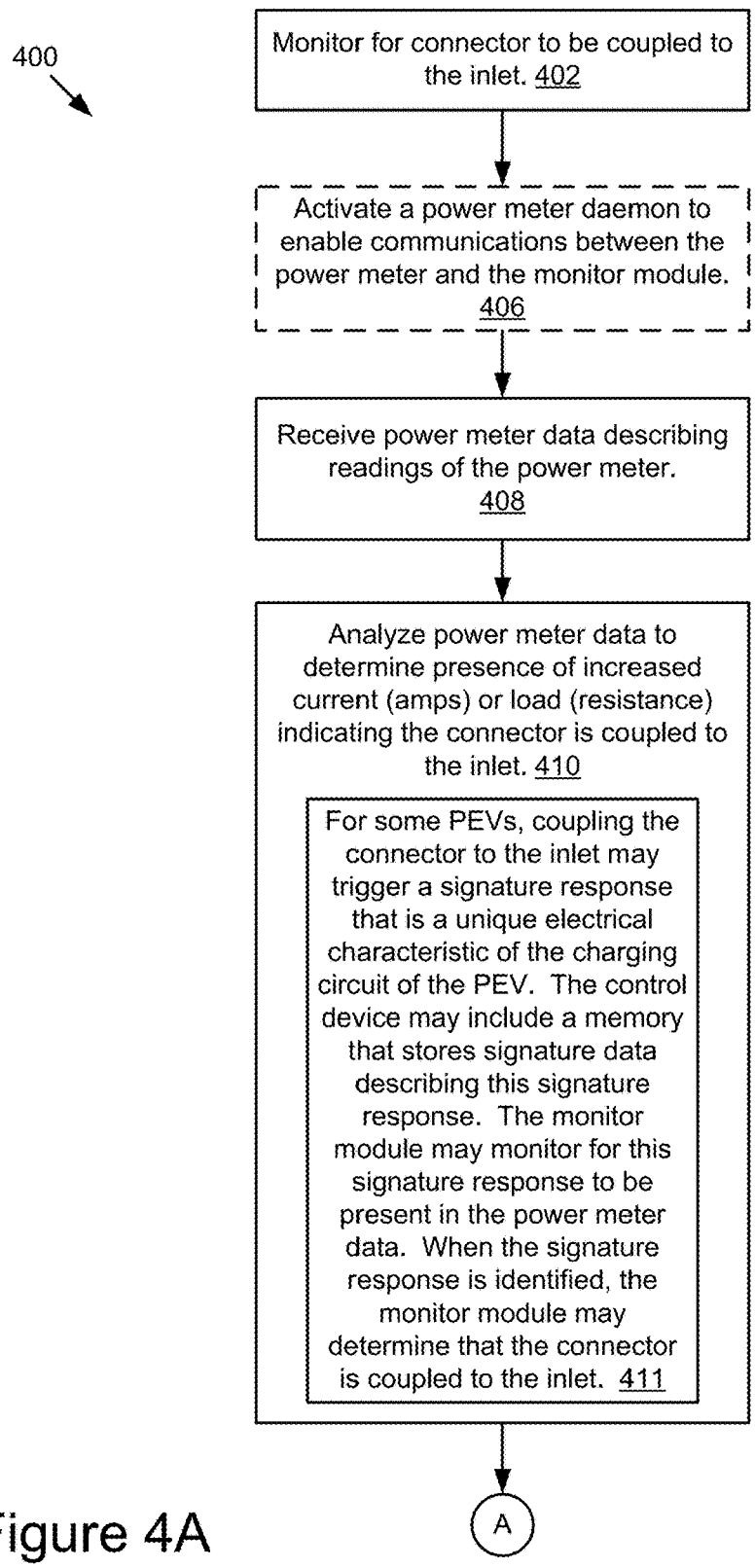
FIGS. 4A to 4E are a flowchart of an example method for estimating a departure time for a Plug-in Electric Vehicle.

Referring now to FIG. 4A. Step 402 may include monitoring for the connector 157 to be coupled to the inlet 155. For example, the monitoring module 204 may include code and routines which, when executed by the processor 225, cause the processor 225 to monitor for the connector 157 to be coupled to the inlet 155.

Step 406 may include activating a power meter daemon to enable communications between the power meter 212 and the monitor module 204. The power meter daemon may include code and routines configured to be executed by the processor 225 to cause the processor 225 to transmit power meter data 299 from the power meter 212 to the monitor module 204.

In some implementations, step 406 may be performed by the monitor module 204. For example, the monitor module 204 may include code and routines which, when executed by the processor 225, cause the processor 225 to activate the power meter daemon.

Step 406 is depicted in a dashed line to indicate that it is an optional step of the method 400 according to some implementations.

Step 408 may include receiving power meter data 299 describing readings of the power meter 212. In some implementations, step 408 may be performed by the communication module 202. For example, the communication module 202 may include code and routines which, when executed by the processor 225, cause the processor 225 to receive the power meter data 299 and either (1) transmit the power meter data 299 to the monitor module 204 or (2) store it in the memory 227 or the storage 241.

Step 410 may include analyzing the power meter data 299 to determine that the connector 157 is coupled to the inlet 155. In some implementations, step 410 may be performed by the monitor module 204. For example, the monitor module 204 may include code and routines which, when executed by the processor 225, cause the processor 225 to analyze the power meter data 299 to determine a presence of an increased electrical current (e.g., increased amps) or load (e.g., increased resistance) present in the power meter data 299, thereby indicating that the connector 157 is coupled to the inlet 155, thereby forming a power coupling 135.

In some implementations step 410 may include sub-step 411. Referring now to sub-step 411. In some implementations, the PEV 123 includes a charger 153 that produces a signature response when the connector 157 is coupled to the inlet 155 and the monitor module 204 may monitor the power meter data 299 to identify the presence of the signature response based in part on the signature data 294. For example, coupling the connector 157 to the inlet 155 may trigger a signature response that is a unique electrical characteristic of the charging circuit of the PEV 123. The signature response may be a pattern or waveform present in the power meter data 299. The control device 199 may include a memory 227 that stores signature data 294 describing the signature response associated with the coupling. The monitor module 204 of the control device 199 may include code and routines which, when executed by the processor 225, cause the processor 225 to analyze the signature data 294 to record (or "learn") the signature response and monitor the power meter data 299 for this signature response to be present in the power meter data 299. When the signature response is identified, the monitor module 204 may include code and routines which, when executed by the processor 225, cause the processor 225 to determine that the connector 157 is coupled to the inlet 155, thereby forming a power coupling 135.

Figure 4B:
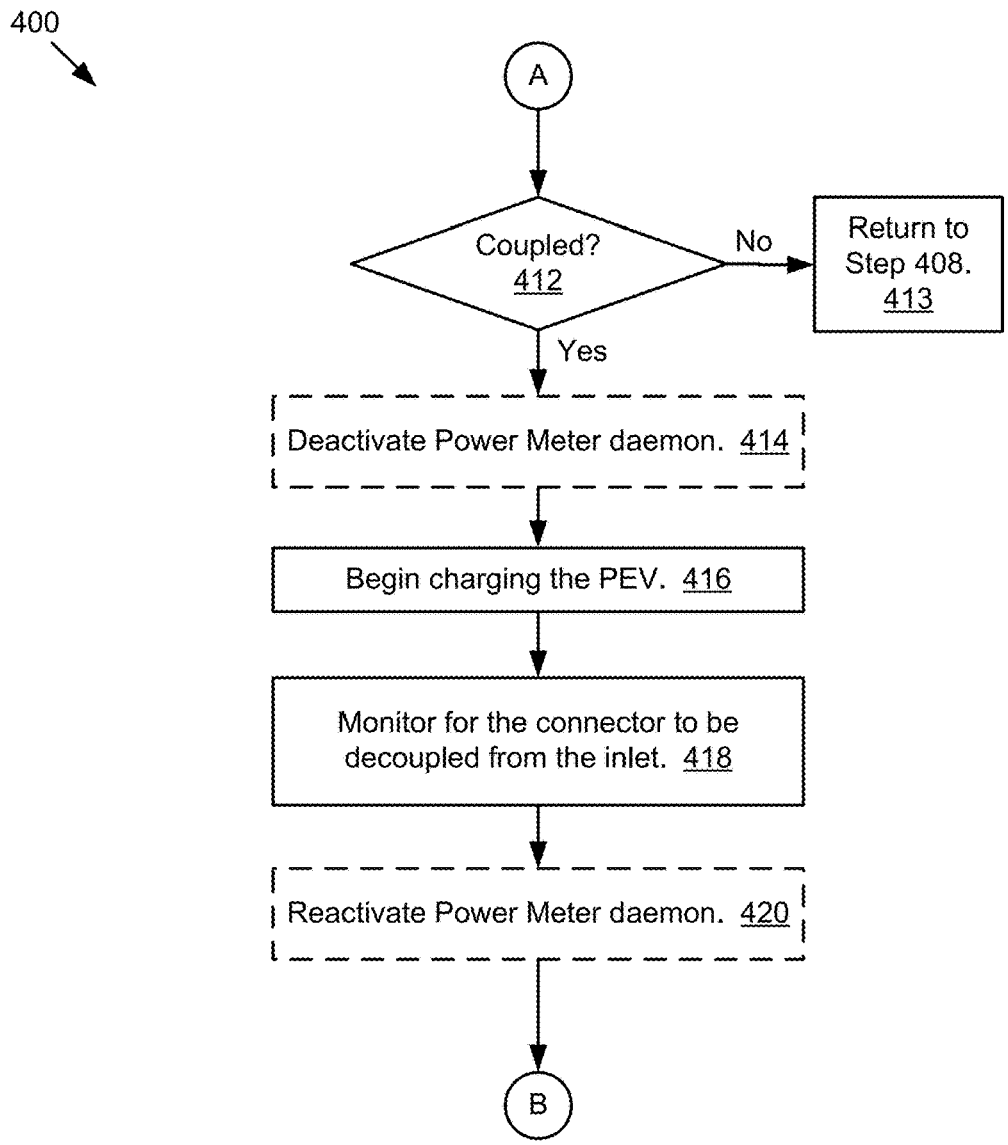

Referring now to FIG. 4B. At step 412 a determination may be made regarding whether the power coupling 135 is formed. In some implementations, step 412 is performed by the monitor module 204. For example, the monitor module 204 may include code and routines which, when executed by the processor 225, cause the processor 225 to determine whether the power coupling 135 is formed based on the analysis of the power meter data 299.

If the power coupling 135 is not formed at step 412, then the method 400 may proceed to step 413. At step 413 the method 400 may proceed to step 408.

If the power coupling 135 is formed at step 412, the method 400 may proceed to step 414. At step 414 the power meter daemon may be deactivated. In some implementations step 414 is performed by the monitor module 204. For example, the monitor module 204 may include code and routines which, when executed by the processor 225, cause the processor 225 deactivate the power meter daemon. Step 414 is depicted with a dashed line to indicate that it is an optional step of the method 400. In implementations of the method 400 that do not include step 414, the method 400 may proceed from step 412 to step 416 if the power coupling 135 is determined to be formed.

Step 416 may include beginning to charge the battery system 151 of the PEV 123. In some implementations, step 416 may be performed by the charger module 206. For example, the charger module 206 may include code and routines which, when executed by the processor 225, cause the processor 225 to charge the battery system 151. In some implementations, step 416 may following step 436 of the method 400. For example, the charger module 206 may not cause the processor to charge the battery system 151 until after one or more time slots are selected from the charge schedule 291 as described below with regards to step 436.

Step 418 may include beginning to monitor for the connector 157 to be decoupled from the inlet 155, thereby breaking the power coupling 135. In some implementations, step 418 may be performed by the monitor module 204. For example, the monitor module 204 may include code and routines which, when executed by the processor 225, cause the processor 225 to begin to monitor for the connector 157 to be decoupled from the inlet 155. For example, the monitor module 204 may cause the processor 225 to analyze the power meter data 299 to identify a decrease in current or a decrease in load.

Step 420 may include reactivating the power meter daemon. In some implementations, step 420 is performed by the monitor module 204. For example, the monitor module 204 may include code and routines which, when executed by the processor 225, cause the processor 225 to reactivate the power meter daemon. Step 420 is depicted with a dashed line in FIG. 4B to indicate that it is an optional step of the method 400 in some implementations.

Figure 4C:
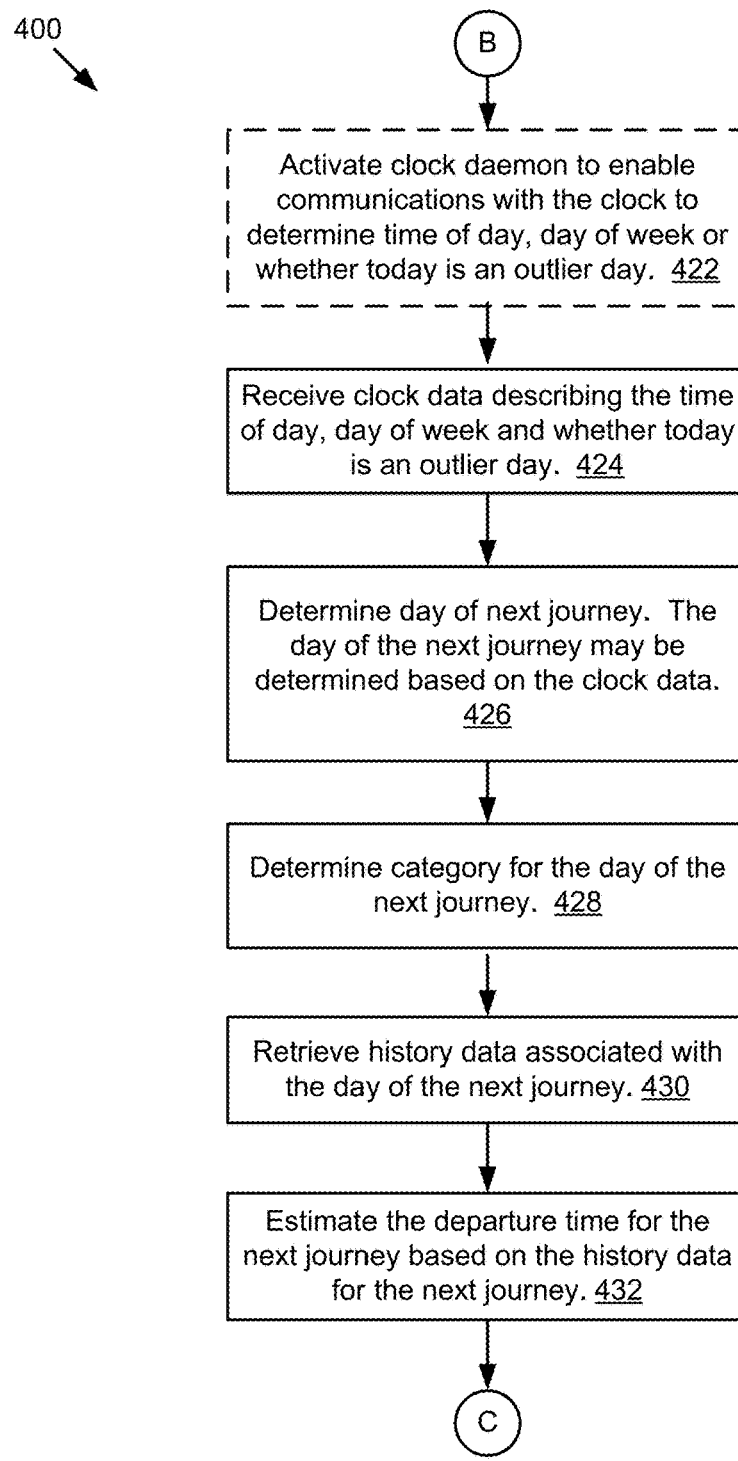

Referring now to FIG. 4C. Step 422 may include activating a clock daemon to enable communication with the clock 214 to receive clock data 298 which may describe one or more of the following: a time of day; a day of week; and whether today is an outlier day (e.g., a holiday, a birthday, an anniversary, a day when schools or work are closed, etc.). Step 422 is depicted in FIG. 4C with a dashed line to indicate that it is an optional step of the method 400 according to some implementations. In some implementations, step 422 may be performed by the charger module 206. For example, the charger module 206 may include code and routines which, when executed by the processor 225, cause the processor 225 to activate the clock daemon.

Step 424 may include receiving clock data 298 from the clock 214. For example, the history builder module 205 may receive the clock data 298 from the clock 214. The clock data 298 may describe one or more of the following: a time of day; a day of week; and whether today is an outlier day (e.g., a holiday, a birthday, an anniversary, a day when schools or work are closed, etc.). In some implementations, step 422 may be performed by the communication module 202. For example, the communication module 202 may include code and routines which, when executed by the processor 225, cause the processor 225 to (1) receive the clock data 298 from the clock 214 and (2) transit the clock data 298 to the charger module 206 or store the clock data 298 in the memory 227 or the storage 241.

In some implementations, the clock data 298 may describe one or more of the present day and the next day. The present day may include the day when the connector 157 and the inlet 155 are coupled to form the power coupling 135. The next day may include the day when the connector 157 and the inlet are decoupled to break the power coupling 135. In some implementations, the next day may occur on a day subsequent to the present day.

The clock data 298 may include electronic calendar data describing one or more birthdays, anniversaries and other outlier days that are personalized for the user of the PEV 123. For example, the clock data 298 may include calendar data describing the birthday of the user, the user's spouse and the user's children. The clock data 298 may also include calendar data describing an anniversary shared by the user and their spouse.

In some implementations, the communication unit 245 may wirelessly connect with a client device associated with the user (e.g., a smartphone, laptop, tablet computer, smartwatch, wearable or some other processor based computing device associated with the user) to wirelessly receive the calendar data stored on the device; this calendar data may then be included in the clock data 298.

In some implementations, the electronic calendar data may describe appointments for the user on the following day and the geographic locations for those appointments. The charge needed for the next journey of the PEV 123 may be estimated based at least in part on the location of these appointments or the habitual driving locations of the driver on different categories of days as indicated in GPS data that may be retrieved from the client device associated with the user or stored in the memory 227.

Step 426 may include determining a day of the next journey. The day of the next journey may be determined based on the clock data 298 received in step 424. In some implementations, the day of the next journey is the next day. For example, if the clock data indicates that the present day is a Monday and it is 7:00 PM at night, then the day of the next journey may be on the following Tuesday morning when the user begins their commute to work. In some implementations, step 426 may be performed by the charger module 206. For example, the charger module 206 may include code and routines which, when executed by the processor 225, cause the processor 225 to analyze the clock data 298 and determine the day of the next journey for the PEV 123 based on the clock data 298 (and any calendar data or GPS data that may be included in the clock data 298).

Step 428 may include determining a category of the next journey. The category of the next journey may be determined based on the clock data 298. For example, the next journey may occur on the next day and the clock data 298 may describe a category for the next day. The category may include one or more of the following categories: weekday; weekend day; Monday; Tuesday; Thursday; Wednesday; Thursday; Friday; Saturday; Sunday; and an outlier category (e.g., the name of a holiday, a description of a birthday, a description of an anniversary, etc.). For example, if the present day is a Sunday and the day of the next journey is the following Monday, then the category is "Monday" or "weekday." If the day of the next journey had been Saturday, then the category may have been "Saturday" or "weekend day." If the day of the next journey occurs on a birthday, then the category may include "Ava's birthday" or some other information that describes the birthday and the person associated with the birthday (in this example, the person's name is "Ava.").

In some implementations, step 428 may include determining whether the day of the next journey is an outlier day. For example, the clock data 298 indicates that the present day is January 5. If January 5 is not a birthday, anniversary, etc., then the present day is not an outlier day since January 5 is not a holiday. However, if the present day is December 24 and the day of the next journey is December 25 (i.e., Christmas, which is a holiday in the United States), then the day of the next journey is an outlier day and the category is an outlier category. In this example, the outlier category is "Christmas."

In another example, the day of the next journey is Easter (i.e., a holiday that occurs on a different day each year), the day of the next journey is an outlier day because it occurs on a holiday and the outlier category is "Easter."

In some implementations, the determination of whether a present day is a holiday may be geographically specific. For example, July 4 is a holiday in the United States, but not in many other countries as July 4 is celebrated as Independence Day in the United States but not in many other counties.

For example, assume that the next day is Jul. 4, 2016. In the United States Jul. 4, 2016 occurs on a Monday, which is a weekday. We may assume that the user of the PEV 123 commutes to work on most Mondays. However, even though Jul. 4, 2016 occurs on a Monday, the user is not likely to work on this day because it is customary for businesses to be closed on July 4 in the United States. Accordingly, the history data 293 for Jul. 4, 2016 is likely to be atypical for a Monday or a weekday since it is also a holiday (i.e., it is an outlier day). In this example the history data 293 generated for Jul. 4, 2016 may be stored in the memory 227 as history data 293 that is associated with an outlier category such as "July 4 holiday." In this way, the history data 293 for Monday, Jul. 4, 2016 will not throw off the statistical data for other categories such as "Monday" or "Weekday."

In some implementations, if the day of the next journey is an outlier day, then step 442 described below with reference to FIG. 4E may be configured so that the history data 293 that is built is stored in the memory 227 as being associated with the category for the outlier and therefore not included as an outlier in the history data 293. For example, if the day of the next journey is a holiday and a weekday, the history data 293 for the charge event is stored as being associated with the outlier category (e.g., "July 4 holiday") instead of the non-outlier category (e.g., "Monday" or "weekday").

In some implementations, step 428 may be performed by the charger module 206. For example, the charger module 206 may include code and routines which, when executed by the processor 225, cause the processor 225 to determine the category of the next journey based on the clock data 298 or other data available to the charger module 206.

Step 430 may include retrieving history data 293 that is associated with the day of the next journey. In some implementations, the history data 293 is stored as a table or some other data structure that is searchable based on the category determined in step 428. For example, the category determined in step 428 is "Monday" and the charger module 206 searches the data structure stored in the memory 227 to identify and retrieve history data 293 associated with previous Mondays. In some implementations, step 430 may be performed by the charger module 206.

In some implementations, the history data 293 may include a description of a habitual departure time associated with Mondays. For example, the history data 293 indicates that the connector 157 is habitually decoupled from the inlet 155 at substantially 5:52 AM on Mondays. In this example, the habitual departure time described by the history data 293 is substantially 5:52 AM.

In some implementations, step 428 may be performed by the communications module 202. For example, the communications module 202 may include code and routines which, when executed by the processor 225, cause the processor 225 to (1) retrieve the history data 293 associated with the day of the next journey and (2) transmit the history data 293 to the charger module 206 or store the history data 293 in the memory 227 or the storage 241.

Step 432 may include estimating the departure time for the next journey based on the history data 293 for the next journey. For example, the history data 293 describes a habitual time when the connector 157 is habitually decoupled from the inlet 155. Step 432 may include estimating that this habitual time (or a time substantially equal to this habitual time) is the departure time.

In some implementations, step 432 may be performed by the charger module 206. In some implementations, step 428 may be performed by the communications module 202. For example, the charger module 206 may include code and routines which, when executed by the processor 225, cause the processor 225 to estimate the departure time for the next journey based on the history data 293 for the next journey.

Figure 4D:
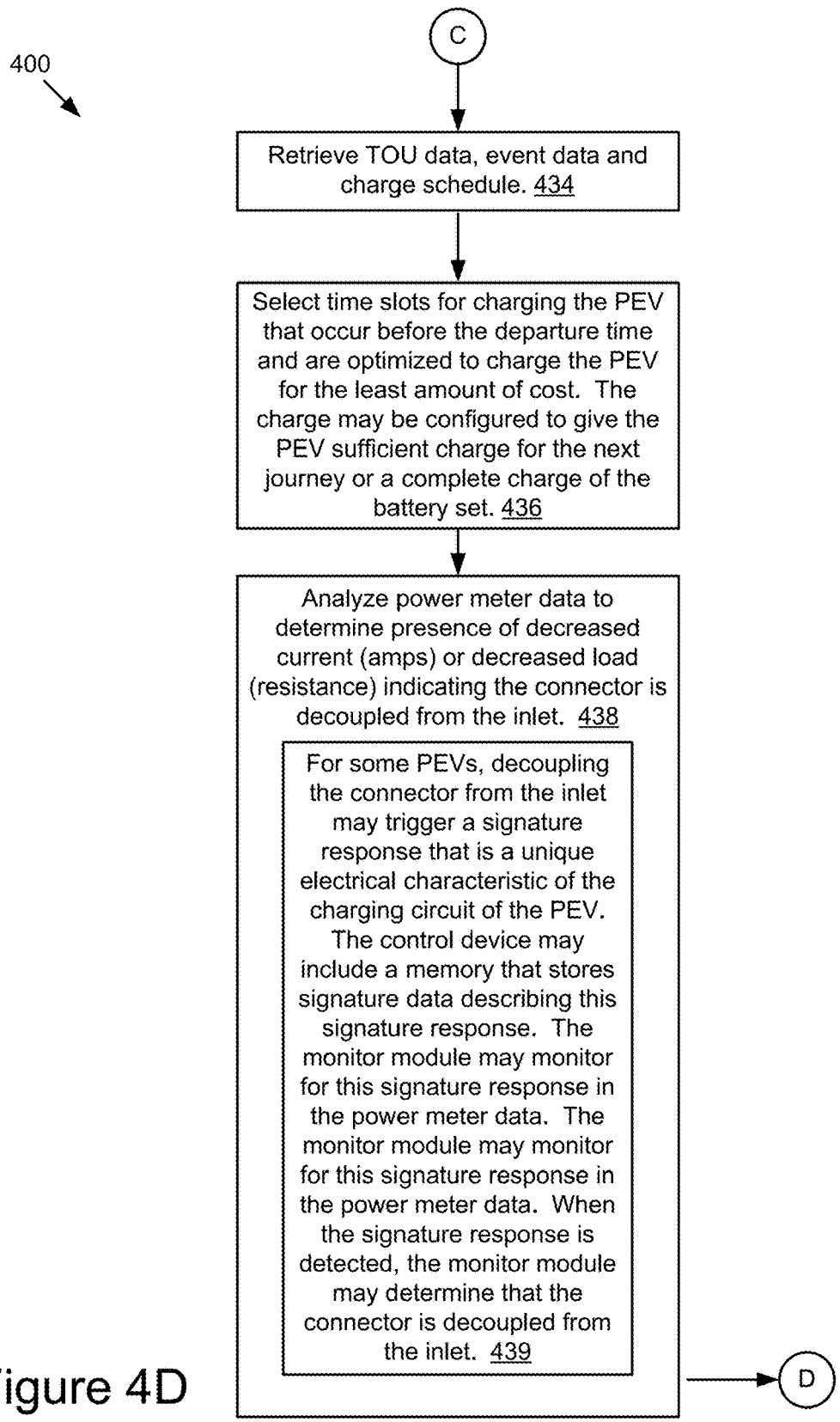

Referring now to FIG. 4D. Step 434 may include retrieving one or more of the following: TOU data 191; event data 295; and a charge schedule 291. For example, the TOU data 191, event data 295 and the charge schedule 291 are retrieved from the memory 227. Step 434 may be periodically repeated to monitor for new event data 295 that may be received prior to the departure time.

In some implementations, step 434 may be performed by the communication module 202. For example, the communication module 202 may include code and routines which, when executed by the processor 225, cause the processor 225 to retrieve one or more of the following: TOU data 191; event data 295; and a charge schedule 291. The communications module 202, when executed by the processor 225, may further cause the processor 225 to transmit the retrieved data to the charger module 206 or store the retrieved data in the memory 227 or the storage 241.

Step 436 may include selecting one or more time slots for charging the PEV 123.

In some implementations, the time slots may be selected so that they occur before the departure time.

In some implementations, the time slots may be optimized to ensure that the PEV is charged for the least amount of cost based on the rates described by the TOU data 191 and the event data 295.

In some implementations, the selected time slots and the charge rate during these time slots may be configured so that one or more of the following goals are met: the PEV 123 is charged for the least amount of cost based on the TOU data 191 and the event data 295; the PEV 123 has a sufficient charge for the next journey prior to the departure time (a sufficient charge may be less than a 100% charge); and the PEV 123 has a substantially 100% charge prior to the departure time.

For example, the clock data 298 describes a time of day for the present day. The estimated departure time describes a time of day for the next day. These two times create a period of time during which the PEV 123 may be charged prior to the next journey. For example, the period of time begins at the time the connector 157 is coupled to the inlet 155 and ends at the departure time, and the PEV 123 may be charged during this time period. The TOU data 191 describes the costs of electricity at different times. The charge schedule 291 describes different slots of time when the PEV may be charged. Some of the slots in the charge schedule may be unavailable due to one or more DR events described by the event data 295. The charger module 206, when executed by the processor 225, may cause the processor 225 to analyze the TOU data 191 and the charge schedule 291 to identify one or more time slots in the charge schedule 291 that have the cheapest price based on the TOU data 191 and provide sufficient time to charge the PEV 123 so that it either has sufficient charge for the next journey or has a complete 100% charge.

In some implementations, charging the PEV 123 during the selected time slots may be referred to as a "charge event."

In some implementations, the charge schedule 291 may be updated in real time or substantially real time based on new DR events that are received.

In some implementations, the selected time slots may be dynamically updated based on any new DR events that are received during the time period for charging the PEV 123.

In some implementations, the clock data 298 includes calendar data and the calendar data includes a description of the journey, including the miles that will be traveled during the journey and the forecasted temperature during the journey. The forecasted temperature affects the charge needed as the range of the PEV 123 decreases with lower temperatures.

In some implementations, step 436 may be performed by the charger module 206. For example, the charger module 206 may include code and routines which, when executed by the processor 225, cause the processor 225 to select one or more time slots for charging the PEV 123 as described above.

Step 438 may include analyzing the power meter data 299 to determine that the connector 157 is decoupled from the inlet 155. For example, step 438 may include the monitor module 204 analyzing the power meter data 299 to determine a presence of a decreased electrical current (e.g., decreased amps) or load (e.g., decreased resistance) present in the power meter data 299, thereby indicating that the connector 157 is decoupled from the inlet 155, thereby forming a power coupling 135. In some implementations, step 438 may be performed by the monitor module 204. For example, the monitor module 204 may include code and routines which, when executed by the processor 225, cause the processor 225 to analyze the power meter data 299 and determine that the connector 157 is decoupled from the inlet 155.

In some implementations step 438 may include sub-step 439. Referring now to sub-step 439. In some implementations, the PEV 123 includes a charger 153 that produces a signature response when the connector 157 is decoupled from the inlet 155 and the monitor module 204 may monitor the power meter data 299 to identify the presence of the signature response based in part on the signature data 294. For example, decoupling the connector 157 from the inlet 155 may trigger a signature response that is a unique electrical characteristic of the charging circuit of the PEV 123. The signature response may be a pattern or waveform present in the power meter data 299. The control device 199 may include a memory 227 that stores signature data 294 describing the signature response associated with the decoupling. The monitor module 204 of the control device 199 may analyze the signature data 294 to record the signature response and monitor the power meter data 299 for this signature response to be present in the power meter data 299. When the signature response is identified, the monitor module 204 may determine that the connector 157 is decoupled from the inlet 155, thereby breaking the power coupling 135.

In some implementations, sub-step 439 may be performed by the monitor module 204. For example, the monitor module 204 may include code and routines which, when executed by the processor 225, cause the processor 225 to monitor the power meter data 299 for the signature response associated with the decoupling, identify the signature response associated with the decoupling and determine that the connector 157 is decoupled from the inlet 155 based on the presence of the signature response associated with the decoupling in the power meter data 299.

Figure 4E:
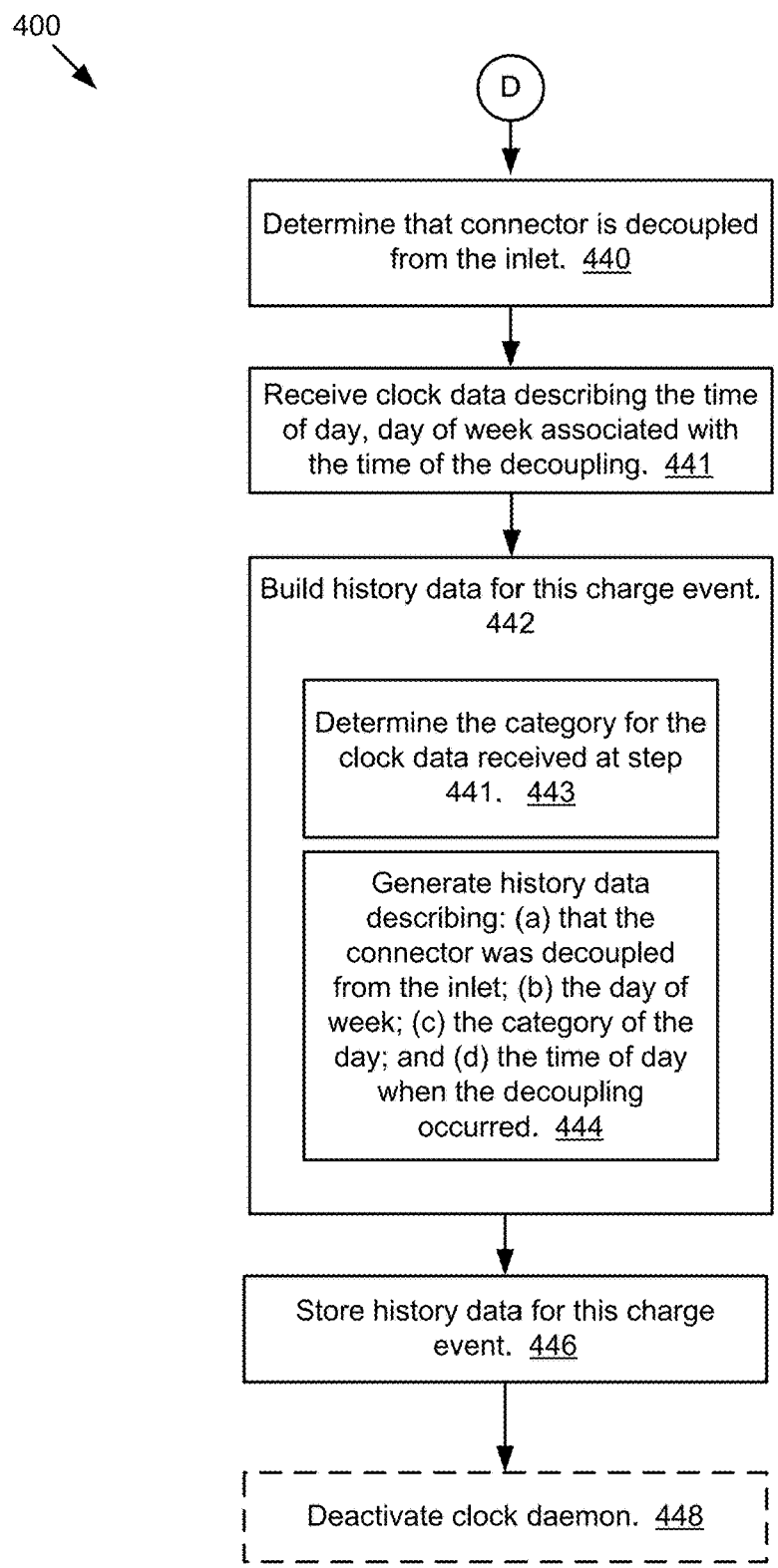

Referring now to FIG. 4E. Step 440 may include determining that the connector 157 is decoupled from the inlet 155. In some implementations, step 440 may be performed by the monitor module 204. For example, the monitor module 204 may include code and routines which, when executed by the processor 225, cause the processor 225 to determine that the connector 157 is decoupled from the inlet 155 based on the analysis of the power meter data 299.

Step 441 may include receiving clock data 298 associated with the time of the decoupling determined at step 440. For example, the time data describes the time of day, day of week, etc. when the connector 157 was decoupled from the inlet 155. In some implementations, step 441 may be performed by the communications module 202. For example, the communications module 202 may include code and routines which, when executed by the processor 225, cause the processor 225 to (1) retrieve the clock data 298 associated with the time of the decoupling and (2) transmit the clock data 298 to the history builder module 205 or store the clock data 298 in the memory 227 or the storage 241.

Step 442 may include building history data for the charge event. A charge event may include an event where the control device 199 begins to charge the PEV 123.

Step 442 may include two sub-steps 443 and 444.

Sub-step 443 may include determining a category that describes the clock data 298 received at step 441. The category may describe the time of the decoupling determined at step 440. For example, the category may include one or more of the following that describes the clock data 298 received at step 441: weekday; weekend day; Monday; Tuesday; Thursday; Wednesday; Thursday; Friday; Saturday; Sunday; and an outlier category. For example, if the decoupling occurred on a Tuesday and Tuesday is not an outlier day, then the category may include "Tuesday" or "weekday." If Tuesday is an outlier day such as Christmas, then the category may include "Christmas."

In some implementations, sub-step 443 may be performed by the history builder module 205. For example, the history builder module 205 may include code and routines which, when executed by the processor 225, cause the processor 225 to determine a category that describes the clock data 298 as described above with reference to sub-step 443.

Sub-step 444 may include generating history data 293 describing one or more of the following: that the connector 157 was decoupled from the inlet 155; the day of the week when the connector 157 was decoupled from the inlet 155; the category of the day when the connector 157 was decoupled from the inlet 155; the time of day when the decoupling occurred.

In some implementations, this information may include history data 293 for the charge event that may now be associated with the category determined in step 441 so that the category has the most up to date information that reflects the habits of the user. For example, when the user decouples the connector 157 from the inlet 155, the control device 199 may estimate that the user is departing for their next journey and so this history data built in sub-step 444 describes the user's departure time for the category determined in sub-step 443.

In some implementations, sub-step 444 may be performed by the history builder module 205. For example, the history builder module 205 may include code and routines which, when executed by the processor 225, cause the processor 225 to generate history data 293 as described above with reference to sub-step 444.

Step 446 may include storing the history data 293 built in step 442 (and its sub-steps 443, 444) in the memory 227. The history data 293 stored in step 446 may be associated with the category determined in sub-step 443. The habitual time of the user for this category may be updated based on this history data 293 built in step 442 (and its sub-steps 443, 444). In some implementations, step 446 may be performed by the communications module 202. For example, the communications module 202 may include code and routines which, when executed by the processor 225, cause the processor 225 to store the history data 293 as described for step 446.

Step 448 may include deactivating the clock daemon. In some implementations, step 448 may be performed by the history builder module 205. For example, the history builder module 205 may include code and routines which, when executed by the processor 225, cause the processor 225 to deactivate the clock daemon. Step 448 is depicted using a dashed line in FIG. 4E to indicate that it is an optional step of the method 400 in some implementations.

Graphic Representations

FIG. 5 is a graphic 500 depicting an example benefit of determining the departure time of a PEV 123 based on when a connector 157 of a control device 199 is decoupled from an inlet 155 of the PEV 123.

Element 505 includes a Y-Axis that illustrates a TOU rate included in the TOU data 191. The X-Axis indicates time (e.g., a time period for charging the PEV 123).

Element 510 includes a Y-Axis that illustrates a charge schedule 291 with an inaccurate departure time estimation. The X-Axis indicates time (e.g., a time period for charging the PEV 123).

Element 515 includes a Y-Axis that illustrates a charge schedule 291 with an accurate departure time estimation determined based on method 400. The X-Axis indicates time (e.g., a time period for charging the PEV 123).

Element 535 indicates a time when the TOU rate is higher and the inaccurate charge schedule charges the PEV 123 prior to the inaccurate departure time 520.

Element 525 indicates a time when the TOU rate is lowest and the accurate charge schedule charges the PEV 123 prior to the accurate departure time 530.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
analyzing, by a control device, power meter data to determine that a connector of the control device is coupled to an inlet of a Plug-in Electric Vehicle ("PEV"), wherein the connector being coupled to the inlet causes a charger of the PEV to be operable to charge a battery set included in the PEV with electricity and the power meter data describes one or more readings of a power meter and the one or more readings describe a unique electrical characteristic of the PEV that indicates whether the connector is coupled to the inlet;
charging the battery set with electricity via a power coupling formed by the connector being coupled to the inlet, wherein the charging occurs responsive to a determination that the connector is coupled to the inlet based on a presence of the unique electrical characteristic of the PEV being identified by the analysis of the power meter data;
retrieving clock data from a non-transitory memory, wherein the clock data describes time information associated with a present day when the connector of the control device is coupled to the inlet of the PEV;
determining a next day of a next journey for the PEV based on the clock data and a category of the next day;
retrieving history data associated with the category of the next day, wherein the history data describes a habitual time when the connector and the inlet are decoupled for a plurality of historical days within the category of the next day; and
estimating that a departure time for the next journey is substantially equal to the habitual time when the connector and the inlet are decoupled for the historical days within the category of the next day.

2. The method of claim 1, wherein the history data describes a historical pattern of times when the connector and the inlet were decoupled for historical days within the category of the next day and the habitual time is indicated by the historical pattern.

3. The method of claim 1, wherein the category of the next day is selected from a set of categories that includes: Monday; Tuesday; Wednesday; Thursday; Friday; Saturday; and Sunday.

4. The method of claim 1, wherein the category of the next day is selected from a set of categories that includes: Weekday; and Weekend day.

5. The method of claim 1, wherein the category of the next day is selected from a set of categories that includes a list of holidays for a geographic region where the PEV is located so that if the next day is a specific holiday then the category selected from the set includes a plurality of historical days that occurred on the specific holiday.

6. The method of claim 5, wherein the clock data describes whether the next day is a holiday and an identifier for the specific holiday.

7. The method of claim 1, wherein the clock data describes a present day of a week.

8. The method of claim 1, wherein the power meter data describes one or more of the following: an increased current that indicates that the connector is coupled to the inlet; and an increased load that indicates that the connector is coupled to the inlet.

9. The method of claim 1, wherein coupling the connector to the inlet triggers a signature response that is detectable in electricity transmitted via the power coupling shared between the control device and the inlet, wherein the power coupling is monitored by the control device using the power meter that records the power meter data describing the electricity transmitted via the power coupling, and the control device determines that the connector of the control device is coupled to the inlet of the PEV based on identifying a presence of the signature response in the power meter data, wherein the signature response includes the unique electrical characteristic described by the power meter data.

10. The method of claim 1, wherein the unique electrical characteristic of the PEV is a characteristic of a charging circuit included in the PEV.

11. The method of claim 1, further comprising:
retrieving a charge schedule from the non-transitory memory, wherein the charge schedule describes a plurality of slots of time that are available for charging the battery set; and
selecting a time slot from the plurality of time slots based on the estimated departure time so that the selected time slot occurs prior to the estimated departure time.

12. The method of claim 11, further comprising:
determining that the connector is decoupled from the inlet based on the power meter data describing an electronical condition that is consistent with a decoupling;
receiving new clock data that describes a time when the connector was decoupled from the inlet and a category for the present day when the connector was decoupled from the inlet;
building new history data that describes the time and the category; and
storing the new history data in the non-transitory memory so that it is associated with other historical days that have the same category.

13. The method of claim 1, further comprising:
retrieving a charge schedule and Time-of-Use data ("TOU data") from the non-transitory memory, wherein the charge schedule describes a plurality of slots of time that are available for charging the battery set and the TOU data describes a plurality of future time periods and one or more prices for electricity during each of the plurality of future time periods; and
selecting a time slot from the plurality of time slots based on the estimated departure time and the TOU data so that the selected time slot occurs prior to the estimated departure time and is optimized to charge the battery set at a substantially minimum price.

14. The method of claim 1, further comprising:
identifying a route for the next journey;
determining an amount of charge needed in the battery set for the PEV to complete the route;
retrieving a charge schedule and Time-of-Use data ("TOU data") from the non-transitory memory, wherein the charge schedule describes a plurality of slots of time that are available for charging the battery set and the TOU data describes a plurality of future time periods and one or more prices for electricity during each of the plurality of future time periods; and
selecting one or more time slots from the plurality of time slots based on the estimated departure time, the TOU data and the amount of charge needed in the battery set, wherein the one or more time slots are selected so that, at the departure time and for a substantially minimized price, the battery set will store at a minimum the amount of charge needed in the battery set for the PEV to complete the route.

15. A computer program product comprising a non-transitory computer-usable medium including a computer-readable program, wherein the computer-readable program when executed on a computer causes the computer to:
analyze, by a processor of the computer, power meter data to determine that a connector of a control device is coupled to an inlet of a Plug-in Electric Vehicle ("PEV"), wherein the connector being coupled to the inlet causes a charger of the PEV to be operable to charge a battery set included in the PEV with electricity and the power meter data describes one or more readings of a power meter that describe a unique electrical characteristic of the PEV that indicates whether the connector is coupled to the inlet;
charge the battery set with electricity via a power coupling formed by the connector being coupled to the inlet, wherein the charging occurs responsive to a determination that the connector is coupled to the inlet based on a presence of the unique electrical characteristic of the PEV being identified by the analysis of the power meter data;
retrieve clock data from a non-transitory memory, wherein the clock data describes time information associated with a present day when the connector of the control device is coupled to the inlet of the PEV;
determine a next day of a next journey for the PEV based on the clock data and a category of the next day;
retrieve history data associated with the category of the next day, wherein the history data describes a habitual time when the connector and the inlet are decoupled for a plurality of historical days within the category of the next day; and
estimate that a departure time for the next journey is substantially equal to the habitual time when the connector and the inlet are decoupled for the historical days within the category of the next day.

16. The computer program product of claim 15, the history data describes a historical pattern of times when the connector and the inlet were decoupled for historical days within the category of the next day and the habitual time is indicated by the historical pattern.

17. The computer program product of claim 15, wherein the computer-readable program when executed on the computer further causes the computer to:
retrieve a charge schedule from the memory, wherein the charge schedule describes a plurality of slots of time that are available for charging the battery set; and select a time slot from the plurality of time slots based on the estimated departure time so that the selected time slot occurs prior to the estimated departure time.

18. The computer program product of claim 15, wherein the computer-readable program when executed on the computer further causes the computer to:
retrieve a charge schedule and Time-of-Use data ("TOU data") from the memory, wherein the charge schedule describes a plurality of slots of time that are available for charging the battery set and the TOU data describes a plurality of future time periods and one or more prices for electricity during each of the plurality of future time periods; and
select a time slot from the plurality of time slots based on the estimated departure time and the TOU data so that the selected time slot occurs prior to the estimated departure time and is optimized to charge the battery set at a substantially minimum price.

19. The computer program product of claim 15, wherein the computer-readable program when executed on the computer further causes the computer to:
identify a route for the next journey;
determine an amount of charge needed in the battery set for the PEV to complete the route;
retrieve a charge schedule and Time-of-Use data ("TOU data") from the memory, wherein the charge schedule describes a plurality of slots of time that are available for charging the battery set and the TOU data describes a plurality of future time periods and one or more prices for electricity during each of the plurality of future time periods; and
selecting one or more time slots from the plurality of time slots based on the estimated departure time, the TOU data and the amount of charge needed in the battery set, wherein the one or more time slots are selected so that, at the departure time and for a substantially minimized price, the battery set will store at a minimum the amount of charge needed in the battery set for the PEV to complete the route.

20. A system comprising:
a Plug-in Electric Vehicle ("PEV") coupled to a control device;
wherein the PEV includes a battery set operable to be charged by the control device, wherein the control device includes a monitor module that includes computer-readable code that, when executed by a processor, causes the processor to perform steps comprising:
analyzing power meter data to determine that a connector of the control device is coupled to an inlet of the PEV, wherein the connector being coupled to the inlet creates a power coupling that causes a charger of the PEV to be operable to charge a battery set included in the PEV with electricity provided by the control device via the power coupling, wherein the power meter data describes one or more readings of a power meter that describe a unique electrical characteristic of the PEV that indicates whether the connector is coupled to the inlet;
charging the battery set with electricity responsive to the analysis of the power data identifying the unique electrical characteristic of the PEV;
determining a next day of a next journey for the PEV based on clock data provided by a clock, wherein the clock data describes time information associated with a present day and a category of a next day occurring after the present day;
analyzing history data associated with the category of the next day to determine a habitual time associated with the category of the next day, wherein the history data describes a historical pattern of times when the connector and the inlet were decoupled for a plurality of historical days within the category of the next day and the habitual time is indicated by the historical pattern; and
estimating that a departure time for the next journey is substantially equal to the habitual time.

21. A method comprising:
determining on a first day that a connector of a control device is decoupled from an inlet of a Plug-in Electric Vehicle ("PEV"), wherein the control device controls access to an electricity source, the connector transmits electricity to the inlet when coupled to the inlet and the inlet transmits the electricity to a charger that charges a battery set included in a battery system of the PEV;
building history data that describes a decoupling time when the connector was decoupled from the inlet based on a presence of a unique electrical characteristic of the PEV being absent;
determining that a second day is similar to the first day based on the first day and the second day occurring on a similar day of a week, wherein the second day occurs subsequent to the first day; and
determining, by the control device, that a departure time for the PEV on the second day is substantially equal to the decoupling time described by the history data.

* * * * *